(12) United States Patent
Lowry et al.

(10) Patent No.: US 7,572,089 B2
(45) Date of Patent: *Aug. 11, 2009

(54) SPRING FASTENER HAVING STABILIZING BARBS

(75) Inventors: Joseph William Lowry, Libertyville, IL (US); Eustathios Vassiliou, Newark, DE (US)

(73) Assignee: Termax Corporation, Lake Zurich, IL (US)

( * ) Notice: Subject to any disclaimer, the term of this patent is extended or adjusted under 35 U.S.C. 154(b) by 137 days.

This patent is subject to a terminal disclaimer.

(21) Appl. No.: 10/934,577

(22) Filed: Sep. 3, 2004

(65) Prior Publication Data

US 2005/0028328 A1 Feb. 10, 2005

Related U.S. Application Data

(60) Continuation-in-part of application No. 10/729,311, filed on Dec. 5, 2003, now Pat. No. 6,835,037, which is a division of application No. 10/209,765, filed on Aug. 1, 2002, now Pat. No. 6,848,874.

(51) Int. Cl.
  *F16B 13/06* (2006.01)
(52) U.S. Cl. .......................... 411/55; 411/61; 411/182
(58) Field of Classification Search ................ 411/55, 411/61, 182
See application file for complete search history.

(56) References Cited

U.S. PATENT DOCUMENTS

| | | | |
|---|---|---|---|
| 2,198,186 A | 4/1940 | Tinnerman | 24/294 |
| 2,223,622 A | 12/1940 | Kost | 24/293 |
| 2,243,322 A | 5/1941 | Van Uum | 24/293 |
| 2,326,903 A | 8/1943 | Tinnerman | 248/500 |
| 2,342,832 A | 2/1944 | Borchers | 292/17 |
| 2,567,884 A | 9/1951 | Heath | 411/61 |
| 2,692,414 A | 10/1954 | Poupitch | 24/293 |
| 2,708,779 A | 5/1955 | Tiger | 24/704.1 |
| 2,720,135 A | 10/1955 | Gisondi | 411/61 |
| 2,825,948 A | 3/1958 | Parkin | 411/477 |
| 2,837,184 A * | 6/1958 | Fernberg | 52/716.7 |
| 2,981,387 A | 4/1961 | Dutchik | 24/295 |
| 3,382,615 A | 5/1968 | Adell | 49/462 |
| 3,550,499 A | 12/1970 | Eilenberger | 411/61 |
| 3,649,059 A | 3/1972 | Davidson | 248/239 |
| 4,382,414 A | 5/1983 | Svirklys | 108/56.1 |
| 4,500,238 A | 2/1985 | Vassiliou | 411/30 |
| 4,595,325 A | 6/1986 | Moran et al. | 411/173 |
| 4,610,588 A | 9/1986 | Van Buren et al. | 411/173 |
| 4,644,612 A | 2/1987 | Osterland | 24/295 |
| 4,765,788 A | 8/1988 | Nowak et al. | 411/61 |

(Continued)

*Primary Examiner*—Flemming Saether

(57) ABSTRACT

The present invention pertains fasteners with critical configuration of the barbs, which allows the fasteners to be used in slots of various widths and panels of various thicknesses, and prevents rattling, which would take place in the case of fasteners of the present state of the art. The critical configuration is based on the special dimensions and special shape of the barbs with regard to the parts and the slots involved in assemblies of the fasteners and the parts. The present invention also pertains assemblies of miscellaneous parts connected together by means of the fasteners, as well as vehicles comprising such assemblies. In addition, the present invention comprises fasteners providing a combination of low barbs and high bent barbs, which combination prevents rattling of the fastener and allows secure attachment on a part, such as a sheet metal, for example.

22 Claims, 6 Drawing Sheets

U.S. PATENT DOCUMENTS

| | | | |
|---|---|---|---|
| 4,874,277 A | 10/1989 | Nowak et al. | 411/61 |
| 4,925,351 A * | 5/1990 | Fisher | 411/182 |
| 4,941,340 A | 7/1990 | Nowak et al. | 72/379.2 |
| 5,100,273 A | 3/1992 | Vassiliou | 411/60 |
| 5,367,751 A | 11/1994 | Dewitt | 24/295 |
| 5,429,467 A | 7/1995 | Gugle et al. | 411/182 |
| 5,447,005 A | 9/1995 | Giannuzzi | 52/698 |
| 5,636,891 A | 6/1997 | Van Order et al. | 296/37.7 |
| 5,725,343 A * | 3/1998 | Smith | 411/55 |
| 5,759,004 A | 6/1998 | Kuffel | 411/508 |
| 5,774,949 A * | 7/1998 | Cornell et al. | 24/293 |
| 5,846,039 A | 12/1998 | Kirchen et al. | 411/34 |
| 5,873,690 A | 2/1999 | Danby et al. | 411/55 |
| 6,095,734 A | 8/2000 | Postadan et al. | 411/182 |
| 6,250,864 B1 | 6/2001 | Vassiliou | 411/30 |
| 6,280,129 B1 * | 8/2001 | Lowry et al. | 411/55 |
| 6,353,981 B1 | 3/2002 | Smith | 24/295 |
| 6,379,092 B1 | 4/2002 | Patel et al. | 411/61 |
| 6,409,443 B1 * | 6/2002 | Lowry et al. | 411/55 |
| 6,517,302 B2 | 2/2003 | Lee | 411/182 |
| 6,524,044 B1 * | 2/2003 | Vassiliou | 411/55 |
| 6,560,819 B2 | 5/2003 | Mizuno et al. | 16/2.2 |
| 6,671,934 B2 * | 1/2004 | Wenzlick et al. | 24/295 |
| 6,709,210 B2 | 3/2004 | Lowry et al. | 411/55 |
| 6,835,037 B2 * | 12/2004 | Lowry et al. | 411/55 |
| 6,848,874 B2 * | 2/2005 | Lowry et al. | 411/182 |
| 6,899,498 B2 * | 5/2005 | Lowry et al. | 411/55 |
| 6,921,237 B2 * | 7/2005 | Vassiliou | 411/55 |
| 2002/0194710 A1 | 12/2002 | Dickinson et al. | 24/295 |
| 2003/0086771 A1 * | 5/2003 | Vassiliou | 411/55 |
| 2003/0145438 A1 * | 8/2003 | Wenzlick et al. | 24/295 |

* cited by examiner

SPRING FASTENER HAVING STABILIZING BARBS

RELATED APPLICATIONS

This application is a Continuation In Part of U.S. Pat. No. 6,835,037 Ser. No. 10/729,311, filed Dec. 5, 2003, which is a Divisional Application of U.S. Pat. No. 6,848,874 Ser. No. 10/209,765, filed Aug. 1, 2002, both of which are incorporated herein by reference.

FIELD OF THE INVENTION

This invention pertains fasteners, and more particularly fasteners which have expandable legs and which attach one object to another object. It also pertains combinations of one or more objects with said fastener(s), assemblies of fasteners with a part, parts or objects connected with the fastener(s), as well as vehicles comprising parts connected with said fastener(s).

BACKGROUND OF THE INVENTION

In the original conventional technology of fasteners employed to securely attach one object to another, such as for example one part to another in the case of an automobile or an appliance, has utilized a nut on one of the two objects, usually welded or glued to the back of said object, and a bolt passing through a hole on the second object in a manner to be engaged by the nut, thereby securing the two objects together.

This arrangement presents many problems, among which, one of the most important is that in the case that one object is hollow, the nut has to be in place at the back of the hollow object before assembling the two objects together. If for any reason the nut is misplaced, and/or if it becomes desirable to introduce a new fastening connection between the two objects, the task of achieving such connection becomes very difficult, if not impossible, for all practical purposes.

The so-called "quick nuts" have also been used to connect two objects. In addition, vibration during the operation of a device, such as an automobile or appliance for example, containing the two objects results very often in loosening of the bolt or "quick nut" and in either full disassembling of the objects from each other, or in a vibration noise which is most annoying and often of unacceptable levels. Further, such connections are not water-resistant and water may be easily penetrate the connection point and be transferred from one side of one or both objects to the other side.

Fasteners of the type described in U.S. Pat. No. 4,500,238 (Vassiliou) have been utilized to reduce considerably the potential of bolt or screw loosening and vibration. They have also eliminated the problem of having to place one member of the fastener at the back portion of the hollow object. These fasteners are placed through a slot from the front part of the hollow object. The second part of the fastener, being usually a bolt or a screw, supports the second object by forcing the legs of the fastener (as described for example in U.S. Pat. No. 4,500,238) to open or expand, thereby securing the two objects together. The fasteners of this type have greatly improved the prevailing torque (torque required to render a screw loose), as well as the pulling force (pulling force applied on a screw to the point of failure) of the system.

The fasteners of the type described in U.S. Pat. No. 4,500,238 have a funnel portion into which an expanding is driven for expanding the legs of the fastener. This funnel has a bucket-like shape which has been impressed on the legs during the manufacture of the fastener. This impression derived funnel is rather inflexible and in some occasions has a tendency to drive the expanding member in undesired direction.

An example of fasteners having oblong funnels is described in U.S. Pat. No. 6,280,129 B1 (Lowry et al.), which is incorporated herein by reference. U.S. Pat. No. 6,409,443 B1, which is also incorporated herein by reference, discloses a spring fastener having a Y-shaped cut funnel, and which may eliminate, if so desired, barbs which are used to support the fastener in one of the parts to be connected together by said fastener.

The fasteners having barbs of the present state in the art are used in industrial applications, wherein the fastener is first inserted into the slot of a sheet, usually a metal sheet, such as the frame of an automobile for example. The barbs are used to secure initially the fastener on the sheet. However, if the width of the slot in which the fastener is inserted is wider than the thickness of the body of the fastener under the head of said fastener, the fastener wobbles within the slot. Similarly if the thickness of the substrate is thinner than necessary, a similar wobbling of the fastener occurs. This is defective behavior of the fastener producing rattling noises among other deficiencies, and in many occasions it is completely unacceptable.

A large number of advantages are derived from the critical configuration of the barbs of the present invention, which allow considerably wider dimensional specifications to both the slot and the thickness of the substrate, such as a metal sheet for example, as described in detail hereinbelow.

SUMMARY OF THE INVENTION

In the text presented below, the following comments and definitions are appropriate:

The expanding member is preferably a screw having threads and a root on which the threads are supported.

Engageable hole or region is an at least partial hole or region which can be engaged with a screw, or similar element.

This invention is related to a spring fastener comprising:

(a) a substantially flat head portion comprising a first hole, the flat head comprising at least a lower side;

(b) a neck having an opening and two side neck portions, a first side neck portion and a second side neck portion, the neck extending from the lower side of the substantially flat head portion at a substantially right angle with respect to the substantially flat head portion;

(c) a first leg and a second leg both legs being substantially flat and extending from the respective first side neck portion and second side neck portion, each leg having an inner surface, the two inner surfaces of the two legs being at an initial proximity with each other, the legs being expandable in opposite directions upon inserting through the first hole an expansion member, thus bringing the expansion member to a contact region of the legs, each leg also having side leg portions;

(d) a funnel configuration in the vicinity of the contact region;

(e) at least one long barb having an origin at a region selected from one of the side neck portions, and one of the side leg portions, the at least one long barb also having a front point which front point substantially reaches or exceeds the lower side of the substantially flat head, the at least one long barb directed initially outwardly away from the legs and in sequence being bent at least firstly toward an inward direction; and f) at least one short barb having an origin at a region selected from one of the side neck portions, and one of the side leg portions, the at least one short barb also having a front point which front point reaches lower than the lower side, the at least one short barb directed outwardly away from the legs.

Preferably, one long barb having an origin selected from a neck portion and a leg portion is disposed across a short barb, the short barb originating at the respective opposite side selected from the neck side portion and the leg side portion.

Also, preferably, at least two long barbs are disposed at a region selected from the second side neck portion and the second side leg portion, while at least two short barbs are disposed at a region selected from the first side neck portion and the first side leg portion.

The head portion of the spring fastener may also comprise an upper side.

The hole may be substantially round, or it may comprise an oblong opening, and preferably is engageable to the expansion member.

The spring fastener may also comprise an elastic body molded at least under the at least lower side of the head of the spring fastener.

Further, the spring fastener may comprise at least one region under the at least lower side, which region is engageable to the expansion member.

Assemblies of parts comprising with such spring fasteners and/or connected with spring fasteners as described above, as well as vehicles comprising such fasteners and/or such assemblies are also encompassed within the limits of the instant invention.

BRIEF DESCRIPTION OF THE DRAWING

The reader's understanding of this invention will be enhanced by reference to the following detailed description taken in combination with the drawing figures, wherein.

DETAILED DESCRIPTION OF THE INVENTION

The fasteners of the type disclosed in U.S. Pat. No. 4,500, 238 are intended for use mainly in hollow walls. Fasteners of the same type, which are used in industrial applications, wherein the fastener is first inserted into the slot of a sheet, usually a metal sheet, such as the frame of an automobile for example, have barbs which secure initially the fastener on the sheet. However, if the width of the slot in which the fastener is inserted is wider than the thickness of the body of the fastener under the head of said fastener, the fastener wobbles within the slot. Similarly if the thickness of the substrate is thinner than necessary, a similar wobbling of the fastener occurs. As aforementioned, this is defective behavior of the fastener since it results in rattling noises among other deficiencies, and in many occasions it is completely unacceptable.

Figure 1:
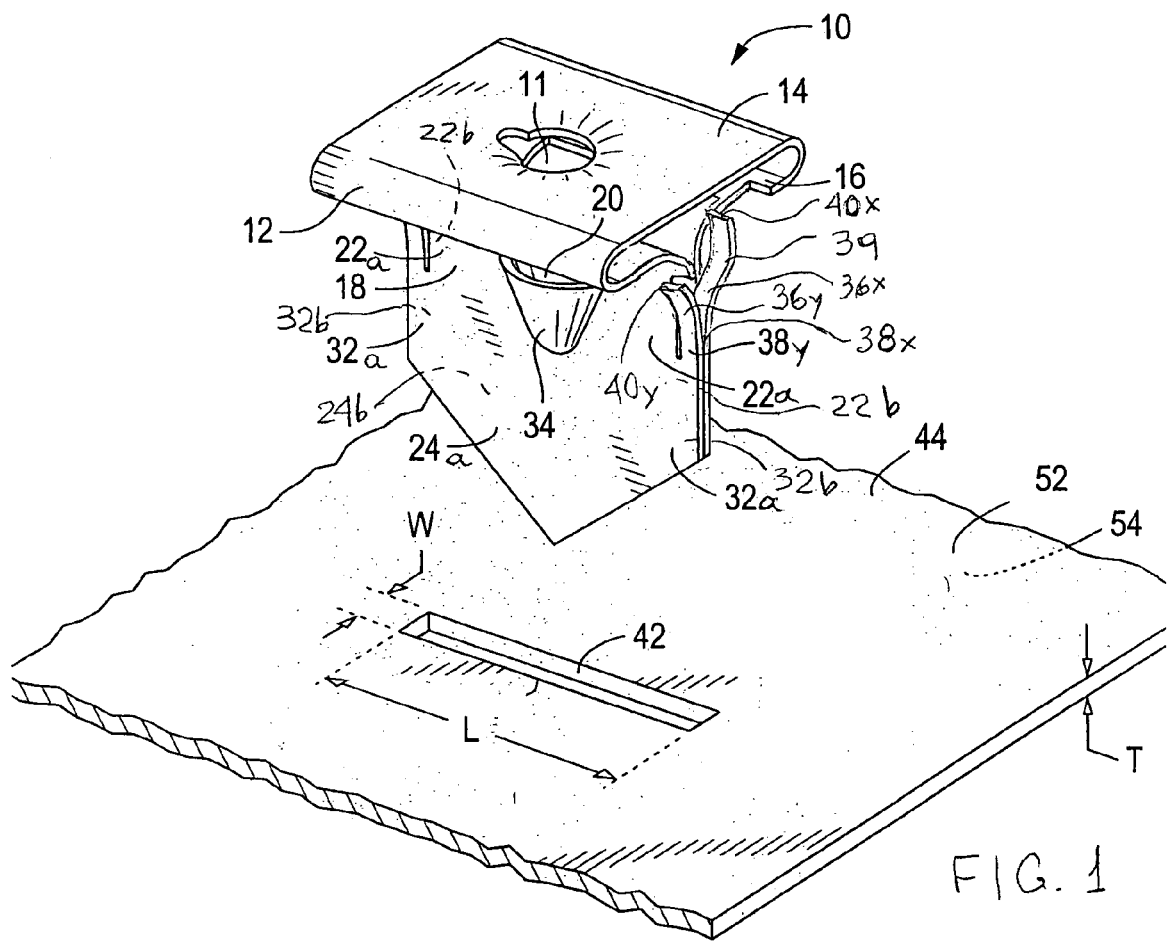
FIG. 1 is a perspective view of fastener and a first part or panel according to a preferred embodiment of the present invention, wherein the fastener comprises long bent barb(s) and short barb(s).
Figure 1A:
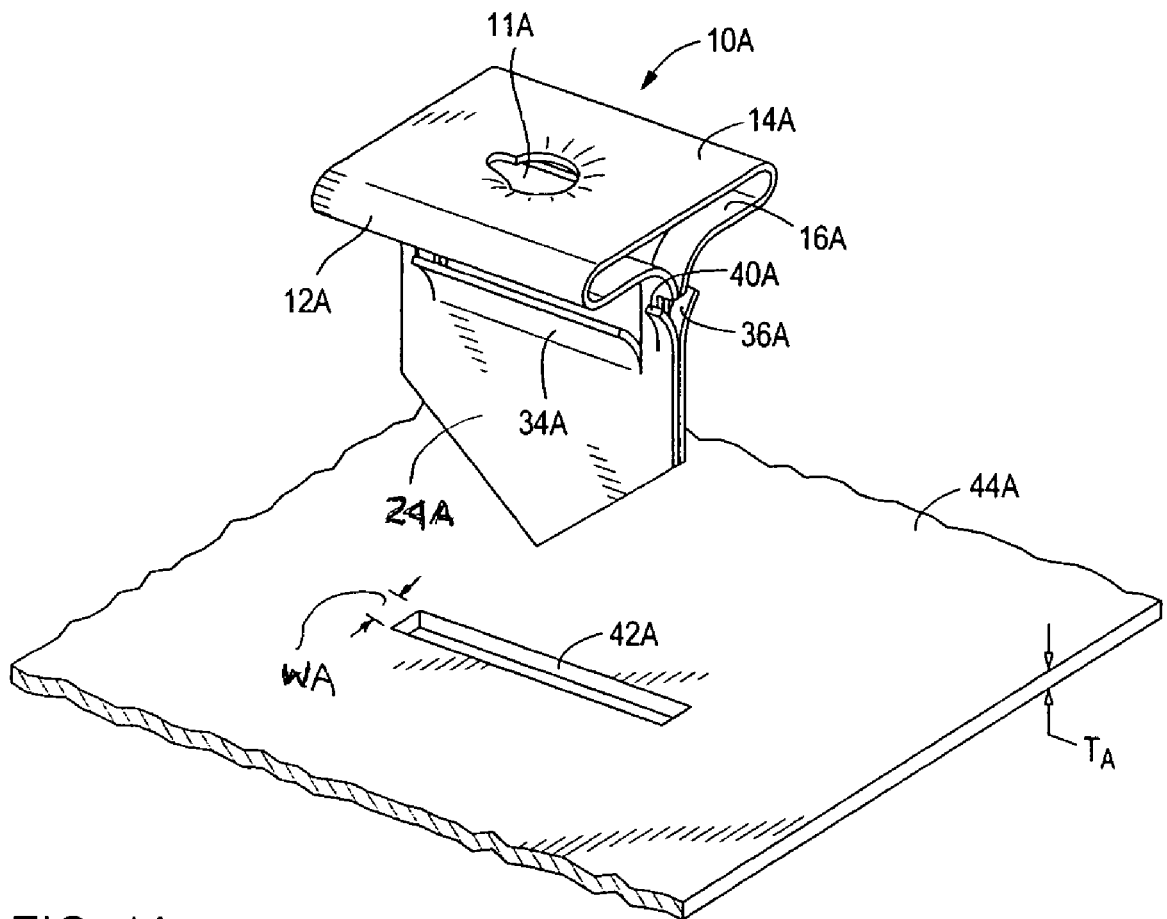
FIG. 1A is a perspective view of fastener having conventional barbs, and a first part or panel having a slot.
Figure 2A:
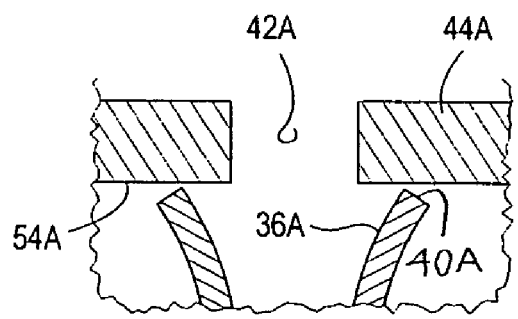
FIG. 2A is a cross section illustrating the barbs with relation to the first part of FIG. 1A, after the fastener has been inserted into a slot of the first part, wherein the front points of the barbs are engaged to the lower surface of the first part.

FIGS. 1A and 2A illustrate fasteners of the present state in the art. The spring fastener 10A comprises a head 12A, which has an upper side 14A with a hole (preferably engageable to a screw or bolt) and a lower side 16A, as well as legs 24A, which extend substantially in a perpendicular direction from the head 12A. The legs in this particular example comprise an oblong funnel 34A, and barbs 36A, which barbs have a front point 40A.

When the spring fastener 10A is inserted into a slot 42A of a panel 44A, the barbs 36A hold the fastener 10A attached to the panel 44A, as the fronts 40A of the barbs 36A are disposed against the lower side 54A of the panel 44A. It is obvious however that if the width WA of the slot 42A is wider than the thickness of the two legs, or if the thickness TA of the panel 44A is higher than the distance between the front ends 40A of the barbs 36A and the lower part 16A of the head 12A, then the spring fastener will be free to wobble within the slot 42A.

Since in practice the manufacturing of any part cannot be made with absolutely perfect dimensions, a considerable tolerance has to be allowed for the dimensions of the panel, such as a metal sheet for example, the dimensions of the slot, and the dimensions of the spring fastener. Therefore, it becomes necessary to have the slot considerably wider than the expected thickness of the two legs 24A, and the distance between the front ends 40A and the lower side 16A higher than the expected thickness TA of the panel 44A. The result is that the spring fasteners of the present state in the art are necessarily apt to wobble within the slot.

The fasteners of the present invention pertain the critical configuration of the barbs, which allow the elimination of such deficiencies, as described in detail hereinbelow.

Figure 2:
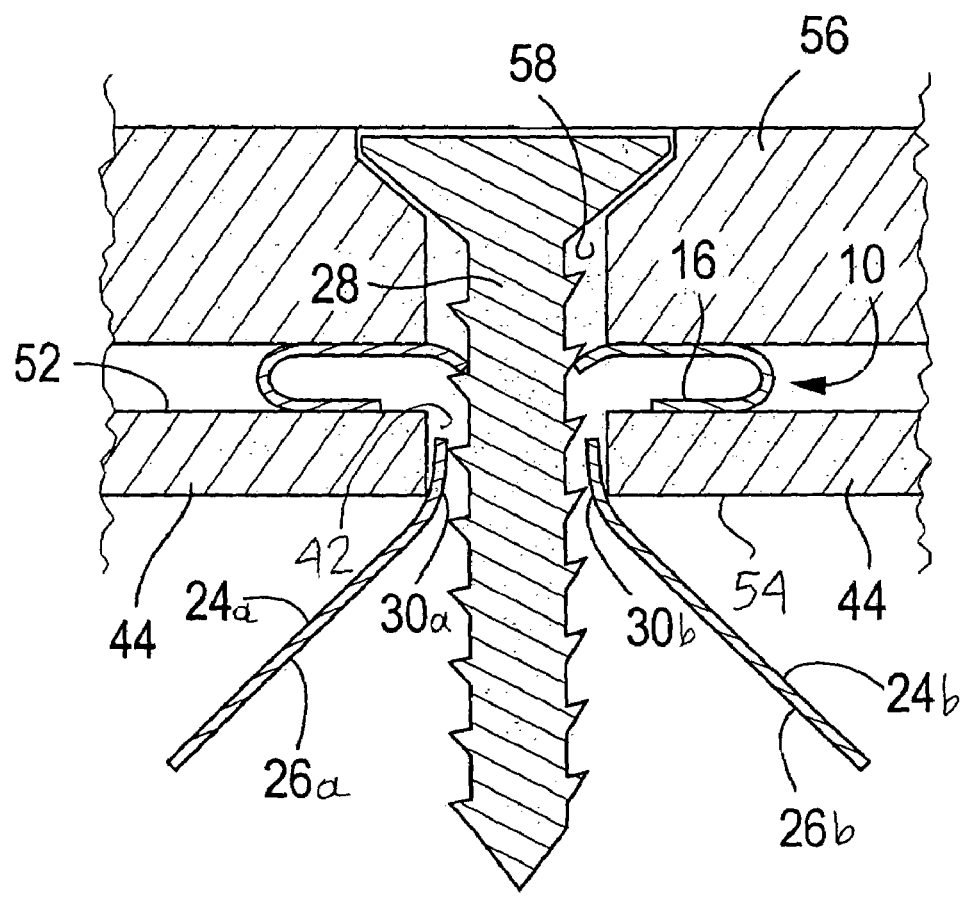
FIG. 2 is a cross-sectional view illustrating two parts connected with the fastener of the instant invention
Figure 3:
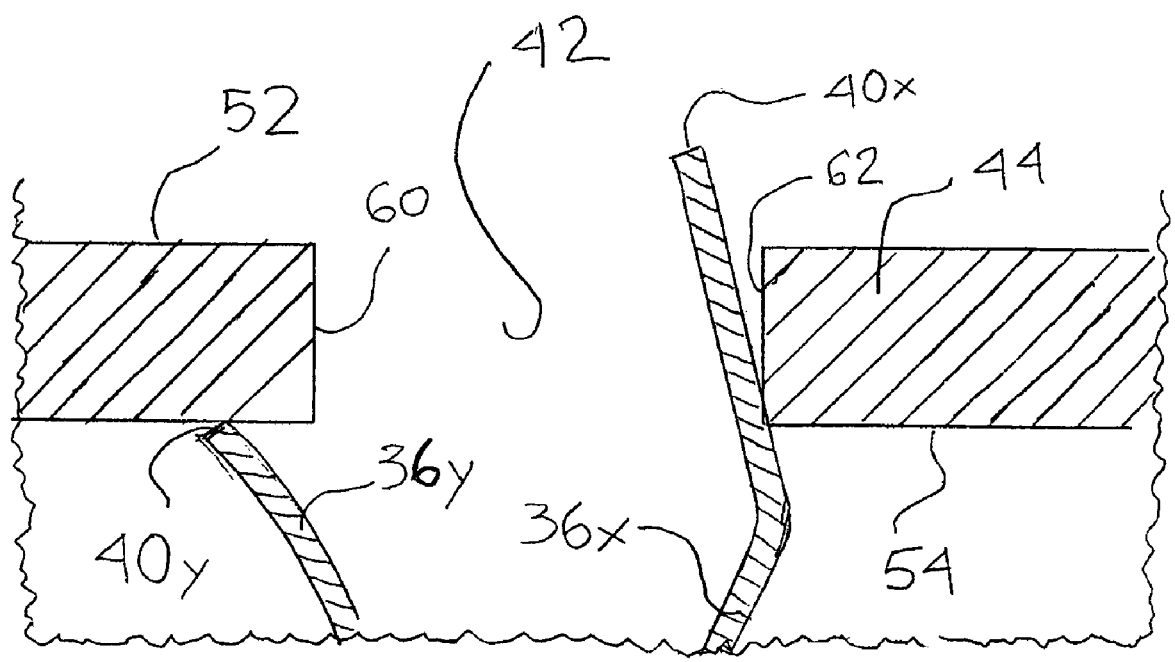
FIG. 3 is a cross section according to another preferred embodiment of the present invention illustrating the barbs in relation to the first part or panel.

Referring now to FIGS. 1-3, there is depicted a spring fastener 10, which comprises a substantially flat head portion 12 having a hole 11. The hole 11 may be substantially round, oblong, or have any other desirable shape.

In this particular illustration, the flat portion 12 comprises an upper side 14 and a lower side 16. However, in other instances, the flat head 12 my comprise only a lower side (single side), as described for example in U.S. Pat. No. 6,250, 864 B1, which is incorporated herein by reference.

The spring fastener 10 further comprises a neck 18 having an opening 20 and two side neck portions, a first side neck portion 22a and a second side neck portion 22b (collectively 22). The neck 18 extends from the lower side 16 of the substantially flat head portion 12 at a substantially right angle with respect to the substantially flat head portion 12.

The spring fastener 10 also comprises a first leg 24a and a second leg 24b both legs being substantially flat and extending from the respective first side neck portion 22a and second side neck portion 22b. Each leg has an inner surface 26a and 26b, respectively. The two inner surfaces 26a and 26b of the two legs 24a and 24b are at an initial proximity with each other. The legs 24a and 24b are expandable in opposite directions upon inserting through the first hole 11 an expansion member 28, thus bringing the expansion member to contact regions 30a and 30b of the legs 24a and 24b. Examples of expansion members are screws, bolts, nails, etc. The hole 11 is preferably but not necessarily engageable to the expansion member 28.

The first leg 24a has side leg portions 32a, while the second leg 24b has side leg portions 32b.

The spring fastener 10 also comprises a funnel configuration which is disposed in the vicinity of the contact region.

The funnel 34 may be conical-like as shown in FIG. 1, or have other shapes, such as for example the funnels disclosed in U.S. Pat. Nos. 6,280,129 B1 and 6,409,443 B1

Figure 4:
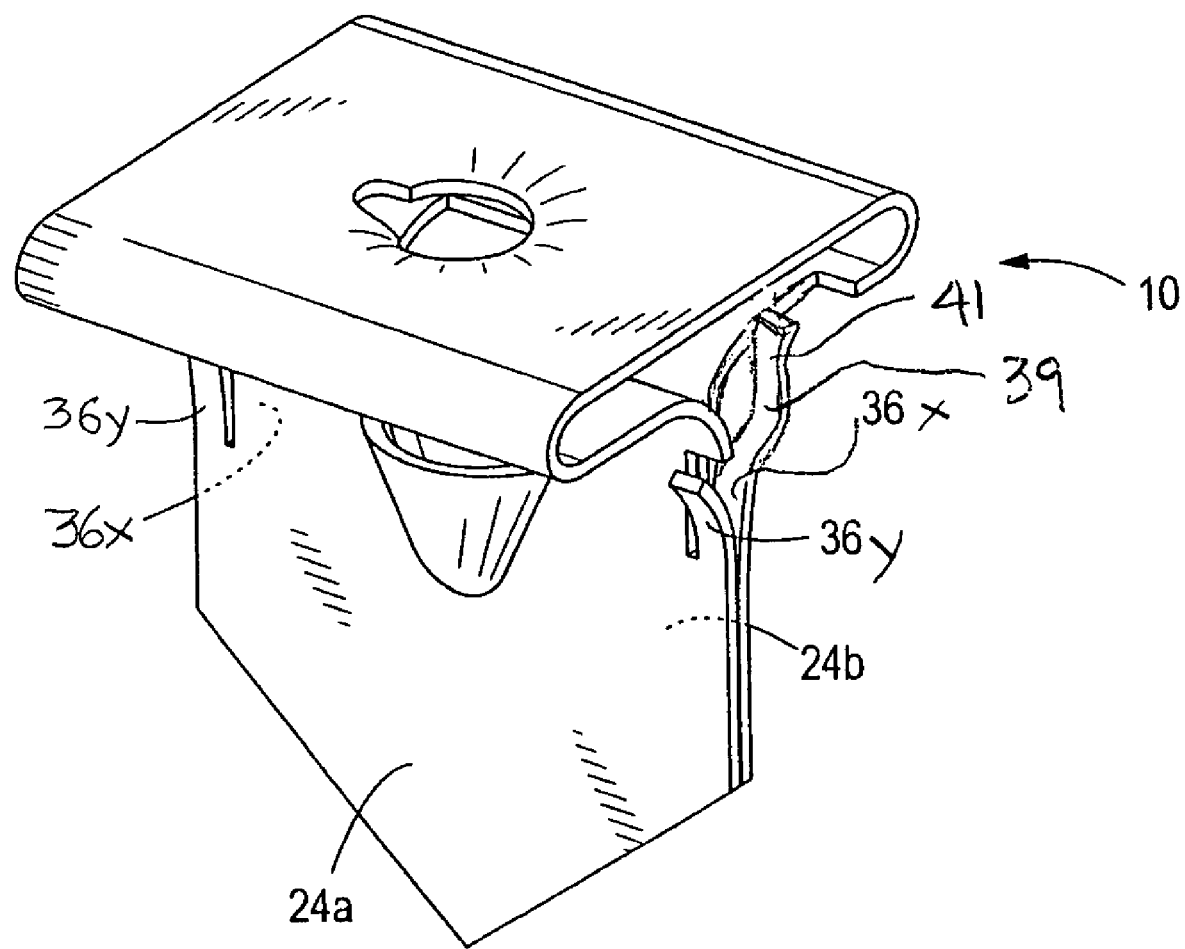
FIG. 4 is a perspective view of a fastener according to the present invention wherein the long barb is more than once bent.

In addition, the spring fastener 10 comprises at least one long barb 36x having an origin 38 at a region selected from one of the side neck portions 22a and 22b, and one of the side leg portions 32a and 32b. The at least one long barb 36x has a front point 40x, which substantially reaches or exceeds the lower side 16 of the substantially flat head 12. The at least one long barb 36x is directed initially outwardly away from the legs 24a and 24b, and in sequence is bent at least firstly toward an inward direction. However, after a first bent 39, which at least firstly bends the long barb toward and inward direction, additional bents, such as bent 41 may also exist, as illustrated for example in FIG. 4.

Finally, the spring fastener 10 further comprises at least one short barb 36y having an origin 38 at a region selected from one of the side neck portions 22a and 22b, and one of the side leg portions 32a and 32b. The at least one short barb 36y also has a front point 40y, which front point reaches lower than the lower side 16, and it is directed outwardly away from the legs.

The origin 38x of the long barb 36x may be at the same or a different level than the origin 38y of the short barb 36y.

At least one long barb may have an origin 38x selected from a neck side portion 22b and a leg side portion 32b is positioned across a short barb 36y disposed opposite the long barb 36b, the short barb 36y originating at the respective opposite side selected from the neck side portion 22a and the leg side portion 32a.

It is highly preferable that at least two long barbs 36x are disposed at a region selected from the second side neck portion 22b and the second side leg portion 32b, while at least two short barbs 36y are disposed at a region selected from the first side neck portion 22a and the first side leg portion 32a.

In operation, a spring fastener 10 is inserted into the slot 42 of a panel, such as a metal sheet for example 44. The short barb 36y is forced to move under the lower side 54 of the sheet 44, and may or may not touch it, depending on the thickness T of the sheet 44. Regardless, the large barb 36x remains within the slot, since its front point 40x substantially reaches or exceeds the lower side 16 of the head 12 of the spring fastener 10. Since the long barb 36x is bent toward an inward direction, it presses on a side 62, which is close to it, and provides the fastener with the tendency to be pushed and be stabilized along a side 60 of the slot 42, which side 60 is close to the short barb 36y. This stabilization takes place within a wide range of slot width W and thickness T of the sheet 44, thus eliminating any wobbling and rattling noises. The combination of the two types of barbs also prevents the spring fastener 10 from dropping out of the slot 42. An additional advantage is that if the width W is adequately broad, the fastener 10 may be manually or otherwise pushed back toward the side 62, on which the long barb 36x presses, bring the front point 40y within the sides 60 and 62, and pull the fastener out of the slot without any damage to it.

In case that each side has one long barb and one short barb, and each long barb is disposed opposite a respective short barb, than the fastener will be forced to assume a diagonal position within the slot.

In sequence, a second object 56, having a hole 58 is placed on top of the panel 44 and the head 12 of the spring fastener 10. The hole 58 is aligned with the hole 11 of the head 12 of the spring fastener 10, and an expanding member such as screw 28 is inserted through both holes, and when it reaches the contacts regions 30a and 30b, forces the legs 24a and 24b to expand in a manner to secure the second object 56 on the panel 44.

It is highly preferable that the hole 11 of the head 12 of the spring fastener 10 is engageable to the expanding member, such as screw 28 for example.

Engagement, if desired, may be achieved in one or more of the miscellaneous regions of the fastener as disclosed in patent application Ser. No. 09/699,760 and U.S. Pat. No. 6,524,044 B1, for example, both of which are incorporated herein by reference.

Figure 5:
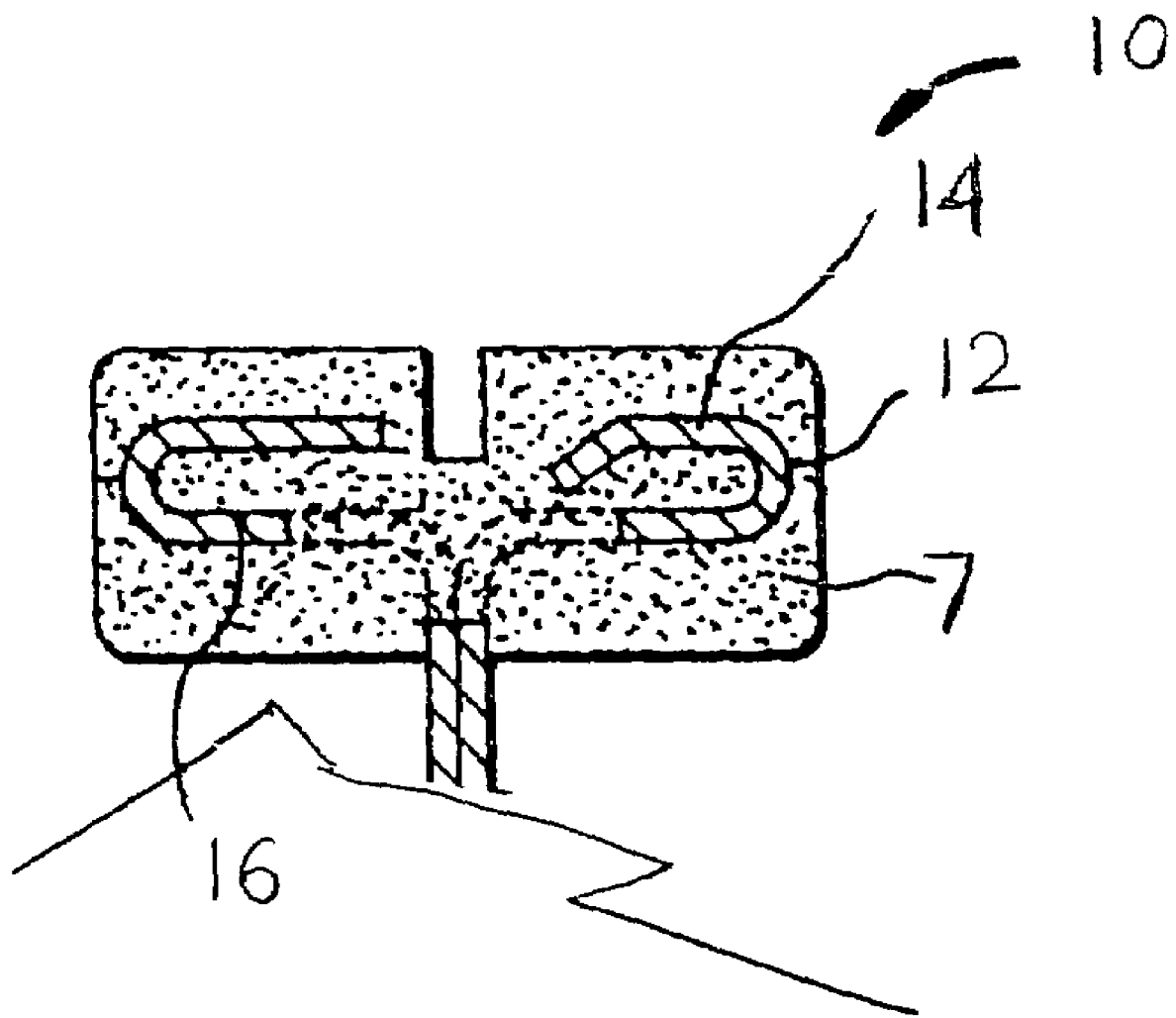
FIG. 5 is a cross sectional view of a fastener according to another embodiment of the instant invention, wherein an elastic body has been molded at least under the lower side of the head of the fastener.

When water-proofing, and/or gas-proofing are desired for a particular application, and/or vibration noises are to be further prevented, an elastic body is preferably integrally molded at least at the lower side of the substantially flat head portion, as illustrated in FIG. 5. Such elastic bodies are for example disclosed in U.S. Pat. No. 5,725,343 (Smith), and U.S. Pat. No. 6,379,092 (Patel et al.) both of which are incorporated herein by reference.

This invention pertains fasteners alone, assemblies of fasteners with a first part, assemblies of fasteners with a first part wherein a second part has been attached to said assemblies, and vehicles comprising any of the above.

Indiscriminately, each of the first and the second parts may be for example a plastic panel or a metal sheet or a handle, or a different type of an object.

It is evident that the embodiments of the above applications may have to be adjusted to fit the requirements of the instant invention.

The embodiments described hereinabove serve illustration purposes only regarding this invention, which should only be bound by the claims.

Any explanations given are speculative and should not restrict the scope of the claims.

A large number of advantages are derived from the critical configuration of the barbs of the present invention, which may allow the extraction of the fastener without destruction of the slot and/or the fastener, as well as the retention of the fastener in slots of various widths preventing rattling noises, as described in detail hereinabove.

The invention claimed is:

1. A spring fastener comprising:
 (a) a substantially flat head portion comprising a first hole, the flat head comprising at least a lower side;
 (b) a neck having an opening and two side neck portions, a first side neck portion and a second side neck portion, the neck extending from the lower side of the substantially flat head portion at a substantially fight angle with respect to the substantially flat head portion;
 (c) a first leg and a second leg both legs being substantially flat and extending from the respective first side neck portion and second side neck portion, each leg having an inner surface, the two inner surfaces of the two legs being at an initial proximity with each other, such that the legs operatively expand in opposite directions upon inserting through the first hole an expansion member, thus bringing the expansion member to a contact region of the legs, each leg also having side leg portions;
 (d) a funnel configuration in the vicinity of the contact region;
 (e) at least one long barb having an origin at a region selected from one of the side neck portions, and one of the side leg portions, the at least one long barb also having a front point which front point substantially reaches or exceeds the lower side of the substantially flat head, the at least one long barb directed initially outwardly away from the legs and in sequence being bent at least firstly toward an inward direction; and (f) at least one short barb having an origin at a region selected from one of the side neck portions, and one of the side leg portions, the at least one short barb also having a front point which front point reaches lower than the lower side, the at least one short barb directed outwardly away from the legs.

2. A spring fastener as defined in claim 1, wherein the at least one long barb having an origin selected from a neck side portion and a leg side portion is positioned across a short barb disposed opposite the long barb, the short barb originating at the respective opposite side selected from the neck side portion and the leg side portion.

3. A spring fastener as defined in claim 1, wherein at least two long barbs are disposed at a region selected from the second side neck portion and the second side leg portion, while at least two short barbs are disposed at a region selected from the first side neck portion and the first side leg portion.

4. A spring fastener as defined in claim 1, wherein the head portion of the spring fastener comprises an upper side.

5. A spring fastener as defined in claim 4, wherein the spring fastener comprises at least one region under the upper side of the head, which region is engageable to the expansion member.

6. A spring fastener as defined in claim 1, wherein the hole is substantially round.

7. A spring fastener as defined in claim 6, wherein the spring fastener comprises an elastic body molded at least under the at least lower side of the head of the spring fastener.

8. A spring fastener as defined in claim 1, wherein the hole comprises an oblong opening.

9. A spring fastener as defined in claim 1, wherein the spring fastener comprises an elastic body molded at least under the at least lower side of the head of the spring fastener.

10. A spring fastener as defined in claim 1, wherein the first hole is engageable to the expansion member.

11. A spring fastener as defined in claim 1, wherein the spring fastener comprises at least one region under the at least lower side, which region is engageable to the expansion member.

12. A vehicle comprising an assembly of a first part with a slot, and a spring fastener within the slot, the spring fastener comprising:

(a) a substantially flat head portion comprising a first hole, the flat head comprising at least a lower side;

(b) a neck having an opening and two side neck portions, a first side neck portion and a second side neck portion, the neck extending from the lower side of the substantially flat head portion at a substantially right angle with respect to the substantially flat head portion;

(c) a first leg and a second leg both legs being substantially flat and extending from the respective first side neck portion and second side neck portion, each leg having an inner surface, the two inner surfaces of the two legs being at an initial proximity with each other, such that the legs operatively expand in opposite directions upon inserting through the first hole an expansion member, thus bringing the expansion member to a contact region of the legs, each leg also having side leg portions;

(d) a funnel configuration in the vicinity of the contact region;

(e) at least one long barb having an origin at a region selected from one of the side neck portions, and one of the side leg portions, the at least one long barb also having a front point which front point substantially reaches or exceeds the lower side of the substantially flat head, the at least one long barb directed initially outwardly away from the legs and in sequence being bent at least firstly toward an inward direction; and (f) at least one short barb having an origin at a region selected from one of the side neck portions, and one of the side leg portions, the at least one short barb also having a front point which front point reaches lower than the lower side, the at least one short barb directed outwardly away from the legs.

13. A vehicle as defined in claim 12, wherein the at least one long barb having an origin selected from a neck portion and a leg portion corresponds to a short barb disposed directly opposite the long barb, the short barb originating at the respective opposite side selected from the neck side portion and the leg side portion.

14. A vehicle as defined in claim 12, wherein at least two long barbs are disposed at a region selected from the second side neck portion and the second side leg portion, while at least two short barbs are disposed at a region selected from the first side neck portion and the first side leg portion.

15. A vehicle as defined in claim 12, wherein the head portion of the spring fastener comprises an upper side.

16. A vehicle as defined in claim 15, wherein the spring fastener comprises at least one region under the upper side of the head, which region is engageable to the expansion member.

17. A vehicle as defined in claim 12, wherein the hole of the head portion of the spring fastener is substantially round.

18. A vehicle as defined in claim 12, wherein the hole of the head portion of the spring fastener comprises an oblong opening.

19. A vehicle as defined in claim 12, wherein the spring fastener comprises an elastic body molded at least under the at least lower side of the head of the spring fastener.

20. A vehicle as defined in claim 12, wherein the legs expand in opposite directions when in contact with an expansion member.

21. A vehicle as defined in claim 12, wherein the first hole of the head portion of the spring fastener is engageable to the expansion member.

22. A vehicle as defined in claim 12, wherein the spring fastener comprises at least one region under the at least lower side, which region is engageable to the expansion member.

* * * * *